(No Model.)
J. D. DREESE.
FISH HOOK.
No. 595,995. Patented Dec. 21, 1897.
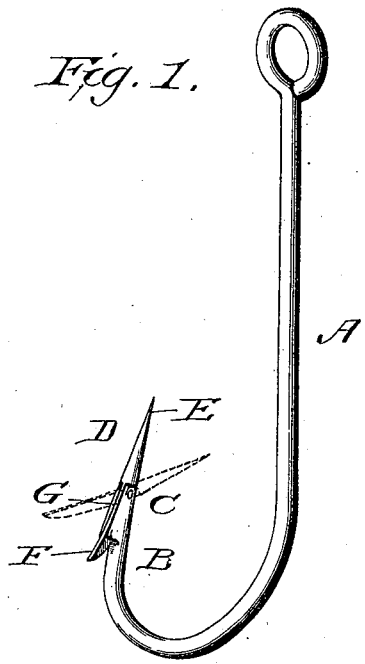
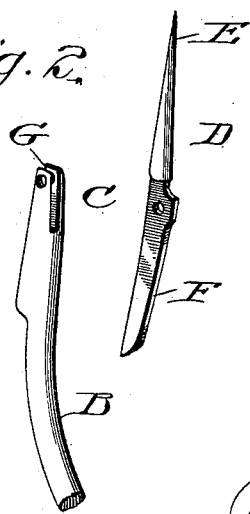
Witnesses
Inventor
John D. Dreese,
by Franklin H. Hough
Attorney

UNITED STATES PATENT OFFICE.

JOHN D. DREESE, OF HALSTEAD, KANSAS.

FISH-HOOK.

SPECIFICATION forming part of Letters Patent No. 595,995, dated December 21, 1897.

Application filed January 4, 1897. Serial No. 617,938. (No model.)

*To all whom it may concern:*

Be it known that I, JOHN D. DREESE, a citizen of the United States, residing at Halstead, in the county of Harvey and State of Kansas, have invented certain new and useful Improvements in Fish-Hooks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in fish-hooks; and it has for its object the provision of a fish-hook in which the point and barb of the hook are provided upon opposite ends of a separate piece of metal which is pivotally connected with the main portion of the hook in such a manner as to cause the piece to turn upon its pivot when the fish has "struck" or has been hooked, thus presenting the entire length of the bar upon the inside of the mouth of the fish and effectually locking the hook in place and preventing the hook from tearing out, as is so frequently the case where hooks of ordinary construction are used.

To this end and to such others as the invention may pertain the same consists in the peculiar construction of the bar or metallic piece which forms the point and barb of the hook and in the novel manner in which the same is connected with the body portion of the hook, all as more fully hereinafter described, shown in the accompanying drawings, and then specifically claimed.

The invention is clearly illustrated in the accompanying drawings, which, with the letters of reference marked thereon, form a part of this specification, and in which—

Figure 1 is an enlarged perspective view of a hook embodying my invention, the bar forming the point and barb of the hook being shown in full lines in its normal position and the position which it assumes when in use being indicated by dotted lines. Fig. 2 is a detail view in perspective of the end of the hook proper, showing the groove provided for the reception of the pivoted bar.

Reference now being had to the details of the drawings by letter, A designates the main portion or body of the hook, which may be of any desired size and is of the usual well-known form. The short arm B of the hook terminates at about the point at which the barb in ordinary hooks is provided, and this shortened short arm is bifurcated, as shown at C, to receive a separate bar D, which is pivoted within this bifurcation. One end of this pivoted bar is sharpened and forms the point E of the hook, while the longer arm F of the bar, which is normally seated within a groove G in the outer face of the short arm B of the hook, forms the barb of the hook.

In use the hook is baited and used in the usual way. It will be seen that as soon as the fish has grasped the hook and pulls upon the same the pivoted bar D will turn upon its pivot, thus presenting the entire length of the bar upon the inside of the mouth of the fish and preventing the hook from tearing out.

Having thus described my invention, what I claim to be new, and desire to secure by Letters Patent, is—

As an improved article of manufacture, a fish-hook having its lower end upwardly bent and terminating in a slot, a widened tapered portion adjacent to the slot, with a recess between its longitudinal walls, combined with the pivoted bar D mounted in the walls of the slotted end and having a contracted portion held normally in the recessed portion with its outer side flush with the edges of the widened portion of the hook, and its lower end forming a barb beyond the shouldered end of the said recessed portion, and the inner sides of the upturned portion of the hook and the bar D being flush, substantially as shown and described.

In testimony whereof I affix my signature in presence of two witnesses.

JOHN D. DREESE.

Witnesses:
D. C. RUTH,
G. M. DRESSLAR.